Patented Sept. 25, 1934

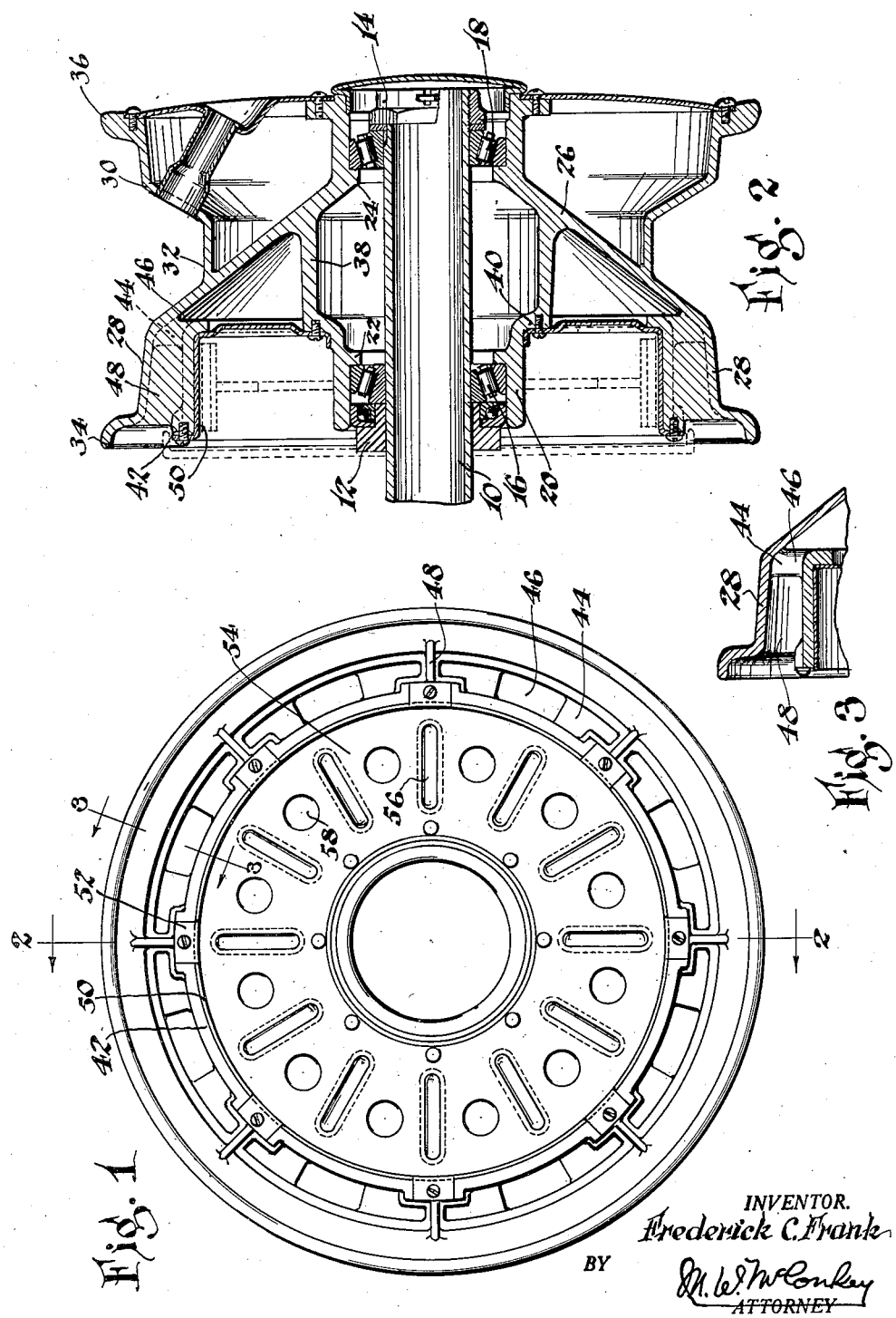

1,974,534

UNITED STATES PATENT OFFICE 1,974,534

WHEEL

Frederick C. Frank, South Bend, Ind., assignor to Bendix Brake Company, South Bend, Ind., a corporation of Illinois Application June 16, 1930, Serial No. 461,339
Renewed February 8, 1933

6 Claims. (Cl. 301—6)

This invention relates to vehicles and more particularly to wheels therefor.

The invention broadly comprehends a wheel comprising a hub, a rim and a member connecting the rim and hub supporting a brake drum and means so associated therewith that the centrifugal action of the rotating wheel will direct a current of air about the flange of the drum.

In the preferred embodiment of the invention, a drum is shown supported beneath the rim of the wheel by a plurality of webs arranged to function as blades to cause a circulation of air around the drum for dissipating the heat from the drum.

An object of the invention is to provide a wheel having associated therewith a brake drum with means for dissipating the heat from the drum.

Another object of the invention is to provide a wheel having a drum supported beneath the rim thereof by a plurality of webs arranged in spaced relation and connecting the rim and drum with suitable passages therebetween, so that the centrifugal action of the rotating wheel directs a current of air about the braking flange of the drum.

Another object of the invention is to provide a wheel having an integral brake drum and means associated therewith for dissipating heat from the drum.

A further object of the invention is to provide a wheel including a rim and a brake drum connected by spaced ribs or webs arranged to provide a circular truss and means for effectively dissipating heat from the drum.

Other objects of the invention will appear from the following description taken in connection with the drawing which forms a part of this specification, and in which:

Figure 1 is a side elevation of a wheel embodying the invention;

Figure 2 is a sectional view substantially on line 2—2, Figure 1; and

Figure 3 is an enlarged detailed sectional view substantially on line 3—3, Figure 1.

Referring to the drawing for more specific details of the invention, 10 represents an axle having a shoulder 12 and a retaining nut 14. Positioned on the axle against the shoulder and the retaining nut are suitable bearings 16 and 18 and positioned for rotation on the bearings is a wheel illustrating the preferred embodiment of the invention.

The wheel comprises a hub 20 having spaced internal flanges 22 and 24 engaging respectively the bearings 16 and 18. The hub 20 has formed thereon and concentric therewith a frustum 26. As shown, the smaller end of the frustum is spaced from the front of the hub and the base of the frustum is in a perpendicular plane adjacent the rear end of the hub. The smaller end of the frustum joins the hub substantially at the internal flange 24 and the base of the frustum terminates in a flange 28 which, in conjunction with a lateral flange 30, provides a suitable tire seat having a rim channel 32 and retaining beads 34 and 36.

The center portion of the hub has an enlarged diameter 38 arranged concentric to and within the frustum. This enlarged portion has one end thereof integral with the frustum and the other end terminates in a shoulder 40 arranged in spaced relation to the rear end of the hub.

Formed integral with the frustum is a brake drum 42. This drum is connected to the frustum substantially at the base thereof by a circumferential web 44 having spaced openings 46. The web 44 is formed on the frustum beneath the rim 28 and the drum is trussed to the rim 28 by ribs 48. These ribs are arranged in spaced relation and alternate with the openings 46. If desired, the ribs 48 may be arranged as fan blades to promote circulation of air through the openings. However, this is by no means essential to the effective operation of the structure.

The drum 42 has shrunk or otherwise secured therein a liner 50 provided with lateral lugs 52 which fit snugly in depressions or notches in the edge of the drum 42. This liner is also supported by a disk 54 suitably secured to the shoulder 40 on the enlarged portion 38 of the hub. As shown, the disk 54 is provided with lateral strengthening ribs 56 alternating with suitable openings 58. In practice, the centrifugal action of the rotating wheel directs a current of air through the openings 46 and 58 and this circulation of air about the braking surface of the drum effectively dissipates heat from the drum.

While the preferred embodiment of the invention has been described in detail, it is not my intention to limit its scope to the particular embodiment shown and described or otherwise than by the terms of the appended claims.

Having thus described the various features of the invention, what I claim as new and desire to secure by Letters Patent is:

1. A wheel comprising a hub, a rim and a member connecting the hub and rim, a brake drum, means for supporting the brake drum beneath the rim having a plurality of passages between the drum and the rim, means associated therewith for directing a current of air around the drum, a liner for the drum and means for supporting the liner having openings therein.

2. A wheel comprising a hub, a rim and a member connecting the hub and rim, a drum positioned beneath the rim, an annular web connecting the drum having openings therein, webs formed integrally with the rim and drum arranged in spaced relation and alternating with the openings in the annular web, a liner for the drum having a disk connected to the hub, the disk being provided with openings for the circulation of air for dissipating heat from the drum.

3. A wheel comprising a hub, a rim and supporting means connecting the hub and rim, said rim having tire bead supporting sections and flanges, and a drop center offset with respect to the rim center, thereby providing a supporting section of greater length on one side of said wheel than on the other, a brake drum of greater diameter than said drop center arranged underneath the supporting section of greater length and radially spaced therefrom, and means arranged at circumferentially spaced intervals for supporting the inner edge of said drum to the under side of the adjacent drop center side, thereby simultaneously supporting said drum and providing means for enforcing air circulation in the space between the drum and said supporting section of greater width.

4. A wheel comprising a rim having a tire bead flange on either edge, an annular recess in the middle portion between the tire bead flanges to permit removal of a tire over the bead flanges without stretching, said recess being offset from the center of the rim and being unequally spaced from said tire bead flanges, and a brake drum having an outer diameter greater than the inner diameter of said recess located under said rim on the opposite side from said offset recess, said drum being slightly spaced from the rim and supported from its inner end by a plurality of circumferentially spaced members rigidly secured beneath said rim to the side of said recess, whereby air currents may pass outwardly between said members and traverse the space between said drum and rim.

5. In a pneumatic tire wheel, a rim having an offset drop center, providing a narrow tire bead supporting flange and a wide tire bead supporting flange, and an internal brake drum of greater diameter than the base of said drop center nested within the annular space partially surrounded by the drop center and the wire tire bead supporting flange of said rim and spacedly adjacent said wide tire bead supporting flange, said drum being secured to the side of said drop center by spaced supports, thereby permitting circulation of air around the inner edge of said drum and between the drum and rim.

6. A wheel comprising a hub, a rim and supporting means connecting the hub and rim, said rim having tire bead supporting sections and flanges, and a drop center offset with respect to the rim center, thereby providing a supporting section of greater length on one side of said wheel than on the other, a brake drum of greater diameter than said drop center arranged underneath the supporting section of greater length and radially spaced therefrom, and means arranged at circumferentially spaced intervals for supporting said drum to the under side of the adjacent tire supporting section of greater length, thereby simultaneously supporting said drum and providing means for enforcing air circulation in the space between the drum and said supporting section of greater width.

FREDERICK C. FRANK.